(12) United States Patent
Ruiz Diez et al.

(10) Patent No.: US 12,709,128 B2
(45) Date of Patent: Aug. 18, 2026

(54) AIR SPRING OPERATION

(71) Applicant: JAGUAR LAND ROVER LIMITED, Warwickshire (GB)

(72) Inventors: David Ruiz Diez, Whitley (GB); James Robertson, Whitley (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 16 days.

(21) Appl. No.: 18/851,122

(22) PCT Filed: Mar. 30, 2023

(86) PCT No.: PCT/EP2023/058312
§ 371 (c)(1),
(2) Date: Sep. 26, 2024

(87) PCT Pub. No.: WO2023/187062
PCT Pub. Date: Oct. 5, 2023

(65) Prior Publication Data
US 2025/0214387 A1 Jul. 3, 2025

(30) Foreign Application Priority Data

Mar. 30, 2022 (GB) ..................................... 2204529
May 5, 2022 (GB) ..................................... 2206579

(51) Int. Cl.
*B60G 17/02* (2006.01)
*B60G 17/015* (2006.01)
(Continued)

(52) U.S. Cl.
CPC ..... *B60G 17/0523* (2013.01); *B60G 17/0155* (2013.01); *B60G 17/016* (2013.01);
(Continued)

(58) Field of Classification Search
CPC ............ B60G 17/0155; B60G 17/0164; B60G 17/0523; B60G 17/052; B60G 17/01908;
(Continued)

(56) References Cited

U.S. PATENT DOCUMENTS 10,960,724 B2 * 3/2021 Meier .................. B60G 17/052
2013/0099459 A1 4/2013 Remboski et al.
(Continued)

FOREIGN PATENT DOCUMENTS

CN 103244597 B 12/2014
DE 102008007206 A1 5/2009
(Continued)

OTHER PUBLICATIONS

International Search Report and Written Opinion of the International Searching Authority for International application No. PCT/EP2023/058312 dated Jul. 18, 2023.
(Continued)

*Primary Examiner* — Hai H Huynh
*Assistant Examiner* — Johnny H Hoang
(74) *Attorney, Agent, or Firm* — Carlson, Gaskey & Olds, P.C.

(57) ABSTRACT

Aspects relate to control systems (100), air spring systems (300), vehicle suspension systems, vehicles (700), methods (600) and computer software for a multi-chamber air spring (200, 250) for a vehicle (700). The multi-chamber air spring (200, 250) comprises at least a first chamber (204, 254) and a second chamber (206, 256) and a valve (210, 260, 262) therebetween. The control system (100) comprises one or more controllers (110). An example control system (100) is configured to: receive a signal indicative of one or more vehicle parameters, the one or more vehicle parameters indicative of one or more vehicle driving conditions; determine a valve switching mode in dependence on the one or
(Continued)

more vehicle parameters, wherein the valve switching mode is indicative of a current profile (400, 440) to operate the valve (210, 260, 262); and output a valve control signal to operate the valve (210, 260, 262) in accordance with the determined valve switching mode.

16 Claims, 5 Drawing Sheets

(51) Int. Cl.
*B60G 17/016* (2006.01)
*B60G 17/027* (2006.01)
*B60G 17/052* (2006.01)

(52) U.S. Cl.
CPC ...... *B60G 17/027* (2013.01); *B60G 2202/152* (2013.01); *B60G 2400/106* (2013.01); *B60G 2400/204* (2013.01); *B60G 2400/821* (2013.01); *B60G 2400/90* (2013.01); *B60G 2500/203* (2013.01); *B60G 2600/184* (2013.01)

(58) Field of Classification Search
CPC .......................... B60G 17/016; B60G 17/017; B60G 2600/07; B60G 2600/184; B60G 2400/106; B60G 2400/90; B60G 2400/204; B60G 2400/41; B60G 2400/821; B60G 2500/203; B60G 2500/11; B60G 2202/152
USPC .......................................................... 701/37
See application file for complete search history.

(56) References Cited

U.S. PATENT DOCUMENTS

| | | | | |
|---|---|---|---|---|
| 2018/0304718 | A1* | 10/2018 | Seto | F04B 39/0005 |
| 2020/0164711 | A1 | 5/2020 | Tuhro et al. | |
| 2021/0053410 | A1* | 2/2021 | Park | B60G 17/0164 |

FOREIGN PATENT DOCUMENTS

| | | | |
|---|---|---|---|
| DE | 102016124122 | A1 | 6/2018 |
| EP | 0166702 | A2 | 1/1986 |
| EP | 0217360 | A1 | 4/1987 |
| GB | 2198814 | A | 6/1988 |
| JP | 2005067549 | A | 3/2005 |
| WO | 2016168500 | A1 | 10/2016 |
| WO | 2020139610 | A1 | 7/2020 |

OTHER PUBLICATIONS

Combined Search and Examination Report under Sections 17 and 18(3) for Application No. GB2206579.1 dated Oct. 26, 2022.

* cited by examiner

AIR SPRING OPERATION

TECHNICAL FIELD

The present disclosure relates to a switching mode of multi-chamber air springs such as those used in vehicle suspension systems. In particular, the present disclosure relates to determining a switching mode of multi-chamber air springs. Aspects relate to control systems for such air springs, air spring systems, vehicle suspension systems, vehicles, methods and computer software.

BACKGROUND

Vehicles (e.g. petrol, diesel, electric, hybrid) may comprise active suspension systems for maintaining vehicle stability and ride comfort. Active suspension systems may comprise dynamic air springs as part of the suspension system. A dynamic air spring may also be called an adaptive air spring, multi-chamber air spring, or an additional switchable volume (ASV) air spring. Such air springs comprise a set of physical volumes which are connected via adjustable restrictions. An example multi-chamber air spring may comprise two volumes, connected via one valve, such as an electronically adjustable valve. This allows for separate spring rates to be effected by having the valve closed or open. Another example multi-chamber air spring may comprise three volumes, connected via two valves such as electronically adjustable valves. This allows for more possible separate spring rates by having the valves closed or open in different combinations. Selection between the air volumes may be performed by opening/closing valves within the air spring to control the air volume in use, to achieve a desired driving characteristic for a vehicle user. The spring state selection of the air spring may be linked to the drive mode of the vehicle (e.g. comfort mode, dynamic mode) and/or may be linked to the driving use case (e.g. off-road driving, city driving, track driving).

Switching between volumes may be performed according to different current profiles, having switching characteristics. For example, a current profile may have a characteristic for closing and/or opening a valve as quickly as possible, such that the vehicle may be able to promptly adjust the spring volume in response to an open/close signal. However, such a current profile may cause a valve to exhibit a “knock” noise when the valve reaches a travel limit, for example when fully open or fully closed. The knock noise may be produced each time a valve is energised using this current profile and this may be audible to a user, particularly in relation to electrical vehicle use which tend to operate more quietly than petrol/diesel vehicles. As another example, a current profile may have a characteristic for closing and/or opening a valve as quietly as possible, such that production of a “knock” noise is greatly reduced. However, such a current profile may cause a valve to close and/or open at a slower rate when compared to other current profiles. As different current profiles deliver different advantages during different vehicle use cases, there is therefore a desire to improve selection of a current profile/switching mode of a multi-chamber spring valve.

It is an aim of the present disclosure to address one or more of the disadvantages associated with the prior art.

SUMMARY OF THE INVENTION

In an aspect there is provided a control system for a multi-chamber air spring of a suspension system of a vehicle, the multi-chamber air spring comprising at least a first chamber and a second chamber and a valve therebetween, the control system comprising one or more controllers, the control system configured to: receive a signal indicative of one or more vehicle parameters, the one or more vehicle parameters indicative of one or more vehicle driving conditions; determine a valve switching mode in dependence on the one or more vehicle parameters, wherein the valve switching mode is indicative of a current profile to operate the valve; and output a valve control signal to operate the valve in accordance with the determined valve switching mode.

Advantageously, the control system may provide a valve switching mode that is relevant to a current measured vehicle parameter indicating the vehicle driving conditions.

The one or more vehicle parameters may indicate an audio vehicle driving condition associated with audio noise. Further, determining the valve switching mode may comprise determining whether an audio noise level of the audio vehicle driving condition is above or below a predetermined audio noise threshold.

Advantageously, the control system may determine the valve switching mode in accordance with an audio noise level so as to suitably select the valve switching mode.

The one or more vehicle parameters indicating the audio vehicle driving condition may comprise one or more of: a vehicle speed; a vehicle acceleration; a road surface roughness on which the vehicle is moving; a vehicle engine revolution rate; a state of an in-vehicle entertainment system; and a weather condition.

Advantageously, the control system may take into account a number of noise generating sources so as to determine an accurate audio vehicle driving condition.

The one or more vehicle parameters may indicate a dynamic vehicle driving condition associated with a dynamic driving event. Further, determining the valve switching mode may comprise determining whether the dynamic driving event is occurring based on the one or more vehicle parameters.

Advantageously, the control system may determine the valve switching mode in accordance with a currently required vehicle performance.

The one or more vehicle parameters indicating the dynamic vehicle driving condition may comprise one or more of: a number of driving surface inputs to a suspension system of the vehicle exceeding a predetermined input number threshold, wherein the driving surface inputs cause actuation of an air spring of the suspension system; a magnitude of driving surface inputs to a suspension system of the vehicle exceeding a predetermined input magnitude threshold; a rate of change of acceleration of the vehicle associated with a dynamic driving event; and one or more impact events in which the vehicle impacts an object during driving.

Advantageously, the control system takes into account a number of dynamic driving events so as to determine an accurate dynamic vehicle driving condition.

The rate of change of acceleration may comprise one or more of a rate of change of lateral acceleration of the vehicle and a rate of change of longitudinal acceleration of the vehicle.

The one or more vehicle parameters may comprise the rate of change of acceleration of the vehicle, wherein the control system may be configured to: receive an indication of the rate of change of acceleration from an accelerometer of the vehicle; compare the rate of change of acceleration to a predetermined rate of change of acceleration threshold;

and determine that the vehicle is performing a dynamic driving event in dependence on the rate of change of acceleration being greater than the predetermined vehicle rate of change of acceleration threshold.

Advantageously, the control system may account for any "jerk" inputs ("jerk" being an alternative term for the rate of change of acceleration) that the vehicle experiences.

The valve switching mode may be selected from a plurality of valve switching modes comprising: a first valve switching mode in which a valve operating speed is greater than a valve switching speed threshold, and wherein an audible noise generated by the valve operating is above an audible valve noise threshold; and a second valve switching mode in which the valve operating speed is less than the valve switching speed threshold, and wherein the audible noise generated by the valve operating is below the audible valve noise threshold.

Advantageously, the control system may execute valve switching in a number of ways that accommodate a user-level experience and vehicle-level characteristic.

The control system may be configured to: receive a plurality of vehicle parameters, comprising a vehicle speed, a number and a magnitude of driving surface inputs to a suspension system of the vehicle; a rate of change of acceleration of the vehicle, and one or more impact events; and determine the valve switching mode in dependence on this plurality of vehicle parameters.

Advantageously, the control system may account for many different vehicle parameters so that the valve switching mode may be accurately determined.

The control system may be configured to: operate the valve in accordance with a first valve switching mode in which the valve operating speed is greater than a valve switching speed threshold, and wherein an audible noise generated by the valve operating is above an audible valve noise threshold; and output the valve control signal to operate the valve in accordance with a second valve switching mode in which the valve operating speed is less than the valve switching speed threshold, and wherein the audible noise generated by the valve operating is below the audible valve noise threshold, in dependence on, within a predetermined period of time, the plurality of vehicle parameters indicating a threshold number of the following switching conditions: the vehicle speed being below a predetermined speed threshold; the number and the magnitude of the driving surface input being below respective predetermined number and magnitude thresholds; the rate of change of acceleration being less than a predetermined acceleration threshold; and a number of object impact signals associated with the one or more impact events being below a predetermined impact threshold. Advantageously, the control system may require many different vehicle parameters to indicate that the second valve switching mode is used only when necessary, and is not incorrectly determined.

In an aspect there is provided an air spring system for a vehicle, comprising: a multi-chamber air spring; and any control system disclosed herein.

In an aspect there is provided a vehicle suspension system comprising any air spring system disclosed herein.

In an aspect there is provided a vehicle comprising any control system disclosed herein, any air spring system disclosed herein, and any vehicle suspension system disclosed herein.

In an aspect there is provided a method of operation of a multi-chamber air spring, the multi-chamber air spring comprising at least a first chamber and a second chamber and a valve therebetween, the method comprising: receiving a signal indicative of one or more vehicle parameters, the one or more vehicle parameters indicative of one or more vehicle driving conditions; determining a valve switching mode in dependence on the one or more vehicle parameters, wherein the valve switching mode is indicative of a current profile to operate the valve; and outputting a valve control signal to operate the valve in accordance with the determined valve switching mode.

In an aspect there is provided computer software which, when executed on a processor of any control system disclosed herein, is arranged to perform any method disclosed herein.

In an aspect there is provided a non-transitory, computer-readable storage medium storing instructions thereon that, when executed by one or more electronic processors of any control system disclosed herein, causes the one or more electronic processors to carry out any method disclosed herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more examples will now be described, by way of example only, with reference to the accompanying drawings, in which.

DETAILED DESCRIPTION

Active suspension systems may comprise multi-chamber air springs as part of the suspension system. Such air springs comprise a set of physical volumes which are connected via apertures which may be opened or closed using e.g. a valve, as discussed in relation to FIGS. 2*a* and 2*b*.

Switching between volumes may be controlled by a controller hosting a control algorithm which controls opening and closing of one or more valves which join or separate air volumes/chambers in the multi-chamber air spring. The control algorithm may monitor an array of sensor inputs from the vehicle and select the most appropriate state for the suspension system and control the valve(s) accordingly. Different states equate to different spring characteristics (e.g. stiffness) provided by adjusting the air volumes within each air spring which is used to provide a suspension force.

Switching between volumes may be performed according to different current profiles, having switching characteristics. For example, a current profile may have a characteristic for closing and/or opening a valve as quickly as possible, such that the vehicle may be able to promptly adjust the spring volume in response to an open/close signal when driving conditions quickly change. However, such a current profile may cause a valve to exhibit a "knock" noise when the valve reaches a travel limit, for example when fully open or fully closed. The knock noise may be produced each time a valve is energised using this current profile and this may be audible to a user, particularly in relation to electrical vehicle use which tend to operate more quietly than petrol/diesel vehicles. As another example, a current profile may have a characteristic for closing and/or opening a valve as quietly as possible, such that the user is not affected by a "knock" noise. However, such a current profile may cause a valve to close and/or open at a slower rate when compared to other current profiles in response to an open/close signal. As different current profiles deliver different advantages to a user during different vehicle use cases, there is therefore a desire to how to appropriately select the current profile/switching mode of a multi-chamber spring valve.

Examples disclosed herein provide a control system for an air valve which may select a valve switching mode according to a current vehicle usage. Examples disclosed herein may allow for an air spring valve to operate in an appropriate valve switching mode while making a best compromise in vehicle-level characteristics. Examples disclosed herein may allow for an improved user experience whilst using a vehicle as well as allow for improved valve lifetimes by mitigating against wear caused by repeated opening and closing of the valve.

Figure 1:
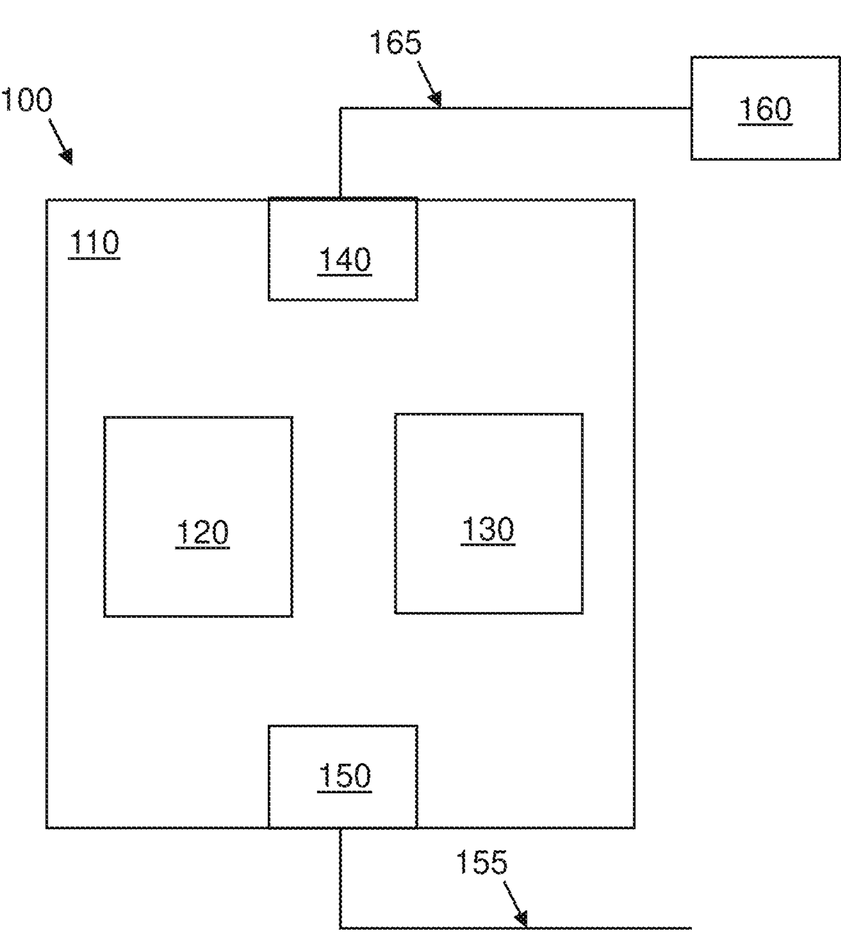
FIG. 1 shows a control system for a multi-chamber air spring according to examples disclosed herein.

FIG. 1 shows a control system 100 for a multi-chamber air spring of a suspension system of a vehicle. The vehicle may be a wheeled vehicle, such as an automobile, or may be another type of vehicle. The multi-chamber air spring comprises at least a first chamber and a second chamber and a valve therebetween, for example as discussed in relation to FIGS. 2*a*-2*b*. The control system 100 may comprise one or more controllers 110. The control system 100 as illustrated in FIG. 1 comprises one controller 110, although in other examples there may be plural controllers 110. The controller 110 comprises processing means 120 and memory means 130. The processing means 120 may be one or more electronic processing device 120 which operably executes computer-readable instructions. The memory means 130 may be one or more memory device 130. The memory means 130 is electrically coupled to the processing means 120. The memory means 130 is configured to store instructions, and the processing means 120 is configured to access the memory means 130 and execute the instructions stored thereon.

The controller 110 comprises an input means 140 and an output means 150. The input means 140 may comprise an electrical input 140 of the controller 110. The output means 150 may comprise an electrical output 155 of the controller 110. The input 140 is arranged to receive a signal indicative of one or more vehicle parameters. The one or more vehicle parameters are indicative of one or more vehicle driving conditions. The input 140 may be arranged to receive one or more input signals 165 from an input means 160 (e.g. a sensor and/or a user input means). For example, an external computing device 160 may transmit an input signal 165 received by the input means 140 e.g. a close signal 165 may be transmitted, to cause a valve of the air spring to close. In some examples the input 140 may be arranged to receive an open signal 165 to cause a valve of the air spring to open. The open signals and the close signals may be referred to as a "valve control signal" 165.

The processing means 120 is configured to determine a valve switching mode in dependence on the received signal indicative of the one or more vehicle parameters. The valve switching mode is indicative of a current profile to operate the valve. The current profile may be indicative of a current to apply to the valve to cause the valve to open and/or close, in response to receiving the valve control signal. The current profile may comprise properties responsible for producing a characteristic of each valve switching mode. Examples are discussed in more detail with reference to FIGS. 4*a*-4*b*. The processing means 120 may provide a signal indicative of the determined valve switching mode (e.g. in accordance with the current profile) to the output.

The output 150 is arranged to output a valve control signal to the valve. The valve control signal is configured to cause the valve to close in accordance with the determined valve switching mode. For example, the output 150 may provide a valve control signal to the valve indicating the current profile that the valve should operate with to cause the valve to operate with the characteristics of the determined valve switching mode.

Advantageously, the control system causes a valve to operate with a valve switching mode with properties suitable for a current vehicle usage because the control system receives a signal indicative of one or more vehicle parameters, which represent one or more vehicle driving conditions. As such, the control system may allow for an air spring valve to operate in an appropriate valve switching mode while making a best compromise in vehicle-level characteristics and a user-perceived driving experience.

Figure 2A:
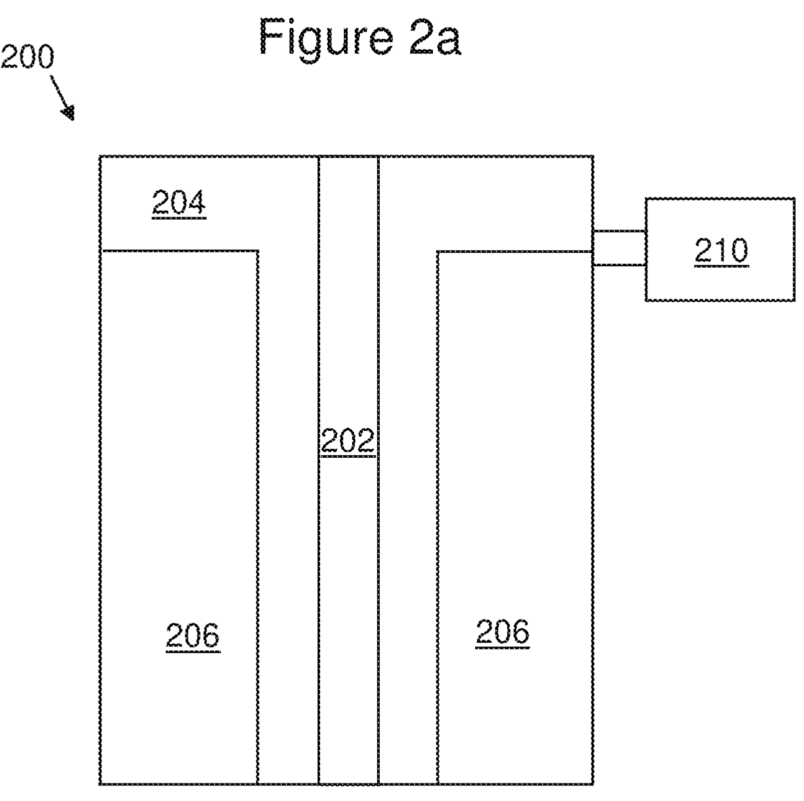
FIGS. 2*a* and 2*b* show schematic multi-chamber air springs according to examples disclosed herein.
Figure 2B:
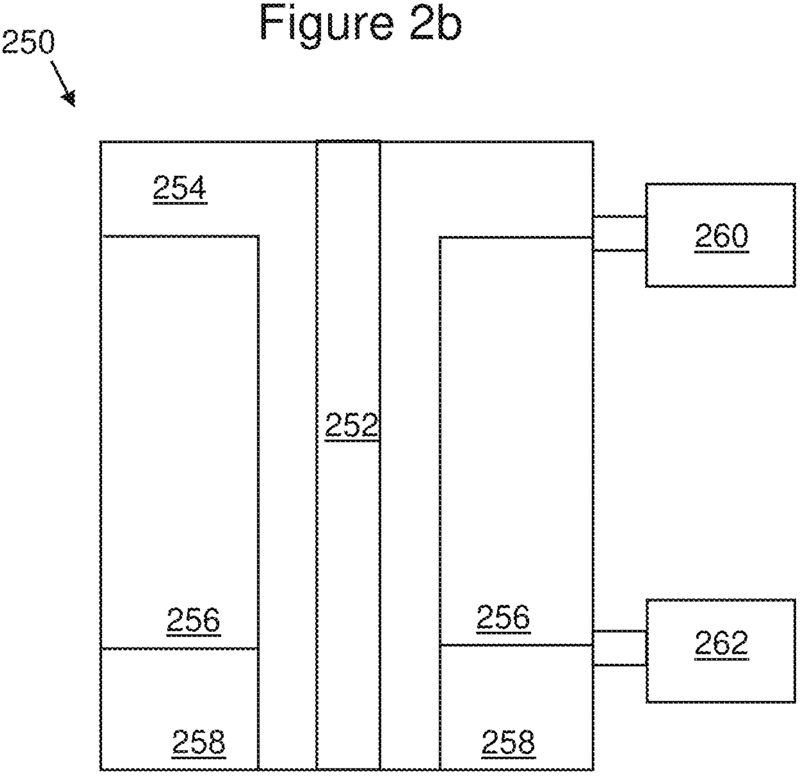

FIGS. 2*a* and 2*b* show schematic multi-chamber air springs 200, 250 according to examples disclosed herein. These figures are schematic: the relative volume sizes of the different air chambers are not to scale, and may not be representative of actual volume sizes or volume ratios between different air chambers in real air springs. FIG. 2*a* shows a multi-chamber air spring 200 comprising a damper 202, a first air chamber 204 and a second air chamber 206, and a valve 210. The damper 202 sits in the centre of the assembly 200, and the air spring comprising the chambers 204, 206 encapsulates it. When the valve 210 is closed, the first and second air chambers 204, 206 are separated from each other. When the valve 210 is open, the first and second air chambers 204, 206 are connected and an air spring force is achieved due to air in the first and second chambers 204, 206 together. By switching the air chamber volume available, the air spring stiffness is changed to provide different possible air spring force effects. The larger the available air volume (e.g. when the first air chamber 204 and the second air chamber 206 are connected by an open valve 210), the softer the air spring is. The smaller the air volume (e.g. when the first air chamber 204 is separated from the second air chamber 206 by the valve 210 so the first air chamber 204 is available to provide an air spring force, but the second air chamber 206 is not available), the stiffer the air spring 200 is.

FIG. 2*b* shows a multi-chamber air spring 250 comprising a damper 252, a first air chamber 254, a second air chamber 256, and a third air chamber 258, as well as a first valve 260 configured to join or separate the first and second chambers

254, 256, and a second valve 262 configured to join or separate the second and third chambers 256, 258. The damper 252 sits in the centre of the assembly 250, and the air spring comprising the chambers 254, 256, 258 encapsulates it. When the valve 260 is closed, the first and second air chambers 254, 256 are separated from each other. When the valve 260 is open, the first and second air chambers 254, 256 are connected. When the valve 262 is closed, the second and third air chambers 256, 258 are separated from each other. When the valve 262 is open, the second and third air chambers 256, 258 are connected. By closing or opening the first and second valves 260, 262 in different combinations, different combinations of the first, second and third air chambers 254, 256, 258 are connected or separated from one another, thereby providing different sized overall air chambers to provide an air spring force. For example, if both valves 260, 262 are open then the spring rate achieved by the system is at its softest state by the three chambers 254, 256, 268 being joined to form one large air chamber. For example, if both valves 260, 262 are closed then the spring rate achieved by the system is at its stiffest state by the first chamber 254 being used without the second and third chambers 256, 268. For example, if only one of the two valves 260, 262 is closed while the other of the valves 260, 262 is open, then the air spring may provide a medium stiffness by experiencing damping from two of the three chambers without the third of the three chambers being used. Usually the stiffest spring rate is achieved by only using the chamber with the smallest volume. The damping forces which may be provided to the vehicle may be decoupled from the air spring forces provided by air springs 200, 250. Forces from both damping and air spring systems may act on the vehicle body and the wheel in some examples.

The switchable air springs such as those in FIGS. 2*a* and 2*b* may be used to provide different degrees of spring stiffness, thereby allowing for a quick transition between a firm suspension for a more responsive driving behaviour, and provide a more comfortable ride, for example for long road trips.

Figure 3:
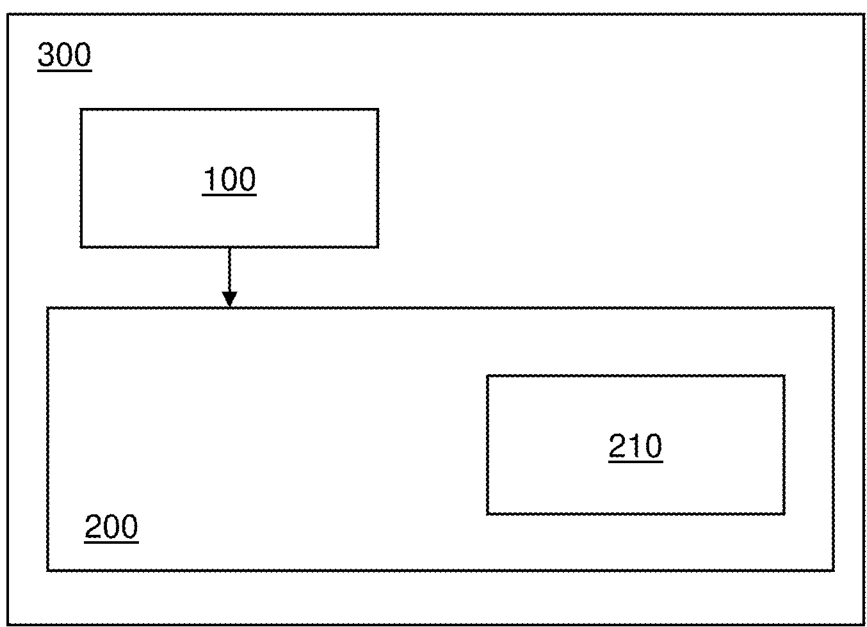
FIG. 3 shows a system comprising a multi-chamber air spring and a control system according to examples disclosed herein.

FIG. 3 shows a system 300 comprising at least one multi-chamber air spring 200 comprising at least one valve 210, such as the air springs described in relation to FIG. 2*a* or 2*b*, and a control system 100 such as that described in relation to FIG. 1. Such a system may be part of a vehicle suspension system. Air springs controlled by control systems described herein may be particularly useful in vehicle suspension systems where a driving condition may change throughout a drive cycle.

The control system 100 is configured to receive a signal indicative of the one or more vehicle parameters. The one or more vehicle parameters are indicative of one or more vehicle driving conditions. For example, the one or more vehicle parameters may indicate an audio vehicle driving condition associated with high levels of audio noise. For example, the one or more vehicle parameters may indicate that the vehicle is currently in a "high audio" vehicle driving condition that produces a large amount of audio noise (e.g. the vehicle travelling at high speed on a bumpy terrain). As another example, the one or more vehicle parameters may indicate that the vehicle is currently in an audio vehicle driving condition that produces a small amount of audio noise (e.g. the vehicle is travelling at lower speed on a smooth terrain).

That is, a vehicle driving condition may indicate an audio noise level of a current usage of the vehicle in a drive cycle. Depending on their value, the one or more vehicle parameters may indicate that this current use case in the drive cycle produces an audio noise that is audible to a user (e.g. a driver and/or a passenger of the vehicle) during a drive cycle. As such, the control system 100 may be configured to determine the valve switching mode by determining whether an audio noise level of the audio vehicle driving condition is above or below a predetermined audio noise threshold.

For example, if the audio noise level of the audio vehicle driving condition is above the predetermined audio noise threshold, the control system 100 may determine the valve switching mode to prioritise a valve operating speed of the valve switching mode over an audible noise level of the valve switching mode, since any noise made by rapid valve closure of the air springs is unlikely to be heard or problematic due to the high audio noise levels arising from other factors. As another example, if the audio noise level of the audio vehicle driving condition is below the predetermined audio noise threshold, the control system 100 may determine the valve switching mode to prioritise the audible noise level of the valve switching mode over the valve operating speed of the valve switching mode, because a noise arising from rapid valve closure of the air spring is likely to be perceived, which is undesirable. Advantageously, the control system 100 may determine the valve switching mode in accordance with an audio noise level so as to suitably select the valve switching mode.

The predetermined audio noise threshold may be a noise threshold defining the point at which a vehicle parameter indicating the audio vehicle driving condition becomes audible to a user in the vehicle. The predetermined audio noise threshold may be determined through experimentation. For example, audio sensors may be placed in a user cabin of the vehicle and the vehicle may be operated through a cycle of potential values of each of the one or more vehicle parameters (e.g. by operating the vehicle on a number of reference surfaces). In some examples, the predetermined audio noise threshold may be set by a user input regarding an audible noise setting to account for respective user's hearing tolerances.

The one or more vehicle parameters indicating the audio vehicle driving condition may comprise one or more of: a vehicle speed, a vehicle acceleration (e.g. lateral and/or longitudinal); a road surface roughness on which the vehicle is moving; a vehicle engine revolution rate; a state of an in-vehicle entertainment system; and a weather condition. The signal indicative of the one or more vehicle parameters may be received by the control system 100 from one or more of: a vehicle speed sensor, an accelerometer, a vehicle height sensor, a gyroscope, a torque sensor of a suspension system of the vehicle, an imaging sensor, an in-vehicle entertainment system state signal and a weather condition signal.

The vehicle speed, the vehicle acceleration, and the vehicle engine revolution rate vehicle parameters may indicate a work rate of the engine of the vehicle which may in turn indicate how much audio noise the engine is generated during use. For example, when one or more of the vehicle speed, the vehicle acceleration, and the vehicle engine revolution rate are large (i.e. above a respective threshold), the engine is likely to be operating at a high work rate and, therefore, may generate an audio noise, audible by the user.

The road surface roughness may indicate an audio noise level that is generated based on the vehicle interacting with the rough/smooth road surface. For example, a high road surface roughness (e.g. a rough surface such as a gravel track, mud ruts and cross-country off-road trails) may comprise many undulations and textures and, as such, cause noises audible within the vehicle cabin. As such, the road surface roughness may be indicated by the number and the magnitude of driving surface inputs to the suspension system of the vehicle. In some examples, the number and the magnitude of the driving surface inputs may be determined by one or more of a torque sensor of the suspension system of the vehicle; a wheel accelerometer (e.g. a vertical acceleration sensor); a suspension height sensor; a vehicle body pitch acceleration sensor; and a vehicle body roll acceleration sensor. In some examples, the road surface roughness may be indicated by a road roughness index, as is discussed below. In some examples, the control system 100 may determine the noise level of the audio vehicle driving condition as a function of vehicle speed. That is, as the vehicle speed increases, the noise produced by interactions/rolling of the vehicle's tyre and the road surface may increase. For example, the control system 100 may determine the road surface roughness and determine an audio noise level based on the determined road surface roughness and the vehicle speed. In other examples, the road surface roughness may be determined by the control system 100 using the driving surface inputs to the suspension system and/or an imaging sensor, wherein the imaging sensor scans the road surface on which the vehicle is driving.

The state of an in-vehicle entertainment system may indicate an audio noise level within the vehicle cabin produced by an in-vehicle entertainment system. For example, the in-vehicle entertainment system may output an audio noise from a radio station, music streaming service, media device or the like. In some examples, the audio noise level output by the in-vehicle entertainment system may be high and therefore the perceived audio noise level within the vehicle cabin may also be high. As another example, the audio noise level output by the in-vehicle entertainment system may be low and therefore the perceived audio noise level within the vehicle cabin may also be low.

The weather condition may indicate an audio noise level within the vehicle cabin produced by current weather conditions. For example, a current weather condition may be raining and/or high windy and may therefore interact with the vehicle, increasing an audio noise level within the vehicle. In other examples, the current weather condition may be dry with no wind and may therefore not increase the audio noise level within the vehicle. The control system 100 may be configured to receive information regarding the current weather condition by receiving a weather condition signal. The control system 100 may be configured to receive the weather condition signal from one or more of a weather condition sensor (e.g. an external moisture sensor of the vehicle) and a weather reporting device, remote to the vehicle.

Therefore, in light of the above, the control system 100 can advantageously takes into account a number of noise generating sources. Based on the determined audio noise level of the audio vehicle driving condition, a general noise level of the vehicle as heard from a user in the vehicle cabin can be determined and used to control the switching profile used to operate the valve(s) of the air springs(s). In a noisy vehicle, the air spring switching may be performed quickly, even if a noise is produced, because it is unlikely to cause a problem amongst the other noises present and allows for quick/responsive air spring mode switching. In a quiet vehicle, the air spring switching may be better performed to reduce the sound produced by closing/opening the valve of the air spring, since it is likely to be perceived which is undesirable.

In some examples, the one or more vehicle parameters may indicate a dynamic vehicle driving condition. The dynamic vehicle driving condition may be associated with a dynamic driving event. The dynamic driving event may be any driving event whereby demands of the vehicle undergo a large and/or sudden change. For example, the dynamic driving event may be the vehicle making a large acceleration, the vehicle sharply turning a corner, the vehicle striking an object, or the like. During such driving events, forces exerted on and by the vehicle may be large (i.e. exceeding a particular threshold). Therefore, ensuring the safety of vehicle operation and a vehicle-level characteristic should be prioritised over a preferred audio noise characteristic. As such, the control system 100 may be configured to determine the valve switching mode by determining whether the dynamic driving event is occurring based on the one or more vehicle parameters. For example, when the control system 100 determines that that the dynamic driving event is occurring based on the one or more parameters, the control system 100 may determine the valve switching mode to prioritise the valve operating speed of the valve switching mode over an audible noise level of the valve switching mode, to provide a more reactive system. As another example, when the control system 100 determines that the dynamic driving event is not occurring based on the one or more parameters, the control system 100 may determine the valve switching mode to prioritise the audible noise level of the valve switching mode over the valve operating speed of the valve switching mode.

The one or more vehicle parameters indicating the dynamic vehicle driving condition may comprise one or more of: a number of driving surface inputs to the suspension system of the vehicle; a magnitude of driving surface inputs to the suspension system of the vehicle; a rate of change of acceleration of the vehicle associated with a dynamic driving event; and one or more impact events in which the vehicle impacts an object during driving. The signal indicative of the one or more vehicle parameters may be determined based on one or more of: an accelerometer (e.g. a vehicle wheel accelerometer, a vehicle body pitch accelerometer, a vehicle body roll accelerometer), a vehicle suspension height sensor, a gyroscope, an imaging sensor, a movement detector monitoring at least one movement of a suspension system of the vehicle, and a torque sensor of the vehicle suspension system.

The control system 100 may be configured to receive a signal indicating the number of driving surface inputs to the suspension system of the vehicle to determine whether the dynamic driving event is occurring. The driving surface inputs may be an input to the suspension system that cause actuation of an air spring 200, 250 of the suspension system. The control system 100 may be configured to monitor the number of driving surface inputs to the suspension system. The control system 100 may be configured to determine that the number of driving surface inputs to the suspension system exceeds a predetermined input number threshold. For example, the control system 100 may compare the number of driving surface inputs to the predetermined input number threshold. If the control system 100 determines that the number of driving surface inputs to the suspension system exceed the predetermined input number threshold, the control system 100 may determine that the dynamic driving event is occurring.

In some examples, the control system 100 may determine that the number of driving surface inputs exceed the predetermined input number threshold within a predetermined input time period (e.g. the control system 100 may determine the average number of the inputs per unit time for the time period) to determine whether the dynamic driving event is occurring.

The control system 100 may be configured to receive a signal indicating the magnitude of driving surface inputs to the suspension system of the vehicle. The control system 100 may be configured to monitor the magnitude of the driving surface inputs into the suspension system. The control system 100 may be configured to determine that the magnitude of the driving surface inputs into the suspension system exceeds a predetermined input magnitude threshold. For example, the control system 100 may compare the magnitude of driving surface inputs to the input magnitude threshold. If the control system 100 determines that the magnitude of driving surface inputs into the suspension system exceed the predetermined input magnitude threshold, the control system 100 may determine that the dynamic driving event is occurring.

In some examples, the control system 100 may determine that the magnitude of the driving surface inputs exceeds the predetermined input magnitude threshold within a predetermined input time period (e.g. the control system 100 may determine the average magnitude of the inputs per unit time for the time period) to determine whether the dynamic driving event is occurring. The predetermined input time period may be the same or different to that for the predetermined number threshold.

The predetermined input number threshold, the predetermined input magnitude threshold and the predetermined time period may be determined through experimentation. For example, a vehicle (e.g. a test vehicle) may be driven on one or more reference terrains (e.g. test tracks, motorways, gravel tracks, mud ruts, rock crawling and large obstacles) and the number of driving surface inputs received by the suspension system of the vehicle while the vehicle travels on the one or more reference terrains may be recorded. As such, the one or more reference terrains may be characterised by the number of driving surface inputs received by the suspension system of the vehicle. Similarly, for the predetermined input magnitude threshold, the vehicle may be driven on the one or more reference terrains and the magnitude of the driving surface inputs received by the suspension system of the vehicle while the vehicle travels on the one or more reference terrains may be recorded. As such, the one or more reference terrains may be characterised by the magnitude of the driving surface inputs received by the suspension system of the vehicle.

In some examples, the vehicle may be driven on the one or more reference terrains and the number of received driving surface inputs and the time period over which the number of driving surface inputs are received by the suspension system may be recorded. As such, the one or more reference terrains may be characterised by the number of driving surface inputs received by the vehicle per unit of time (i.e. the number of inputs per second). Similarly, for the predetermined input magnitude threshold, the vehicle may be driven on the one or more reference terrains and the magnitude of the driving surface inputs and the time period over which the driving surface inputs are received by the suspension system may be recorded. As such, the one or more reference terrains may be characterised by the magnitude of driving surface inputs received by the vehicle per unit time (e.g. the time average of the driving surface input magnitude).

In some examples, the control system 100 may be configured to determine a road roughness index (RRI) using the number of driving surface inputs and the magnitude of driving surface inputs per unit period of time. The RRI provides an indication of the roughness of a driving surface. The RRI may have a small value when the driving surface has a low roughness (e.g. a recently resurfaced A road, a smooth motorway). The RRI may have a large value when the driving surface has a high roughness (e.g. a rock crawling surface, large obstacles) The control system 100 may be configured to determine the RRI by combining the information of sensors of the vehicle that can provide information regarding the road roughness. For example, the sensors may comprise one or more of: a vertical wheel accelerometer; a vertical suspension height sensor; a vehicle body pitch acceleration sensor; and a vehicle body roll acceleration sensor. The control system 100 may be configured to sum, over time, the received information regarding the road roughness. As such, the control system 100 can account for both the magnitude and the number of the driving surface inputs when determining the RRI. The control system 100 may be configured to scale, according to an empirical tuning process, to determine the RRI for the driving surface. The RRI may be normalised to have a value between 0 and 1. The empirical tuning process may be one or more of a polynomial function and a look-up table. The empirical tuning process may be determined through experimentation. For example, the vehicle may be driven on one or more reference surfaces and the response from the multi-chamber air spring may be recorded so to characterise the response of the multi-chamber air spring for different driving use cases. The control system 100 may be configured to determine that a dynamic driving event is occurring based on the value of the RRI. For example, the control system 100 may compare the RRI to a predetermined RRI threshold. The predetermined RRI threshold may be determined by registering the RRI value for which the vehicle-level (and therefore valve operating speed) is to be prioritised over the audible noise generated by the valve operating.

The one or more vehicle parameters indicating the dynamic vehicle driving condition may comprise the rate of change of the acceleration (e.g. the "jerk") of the vehicle. The control system 100 may be configured to receive a signal indicative of the rate of change of acceleration of the vehicle. The rate of change in acceleration may be of one or more of a rate in change of a lateral acceleration of the vehicle and a rate in change of a longitudinal acceleration of the vehicle. The control system 100 may be configured to receive the signal from an accelerometer of the vehicle. That is, the control system 100 may be configured to receive an indication of the rate of change in acceleration from the one or more accelerometers of the vehicle. For example, the control system 100 may be configured to continuously receive an indication of the acceleration of the vehicle. Then, the control system 100 may be configured to determine the rate in change of acceleration based on the received indication of the acceleration of the vehicle. The control system 100 may be configured to compare the received indication of the rate of change of acceleration to a predetermined rate of change of acceleration threshold. The predetermined rate of change of acceleration threshold may be determined through experimentation. For example, the rate of change of acceleration of the vehicle may be monitored while the vehicle is being operated in a known dynamic driving event and as such, the values of the rate of change of acceleration of the vehicle indicative of the dynamic driving event may be determined. As such, the predetermined rate of change of acceleration threshold may be determined.

The control system 100 may be configured to determine that the vehicle is performing a dynamic driving event in dependence on the received indication of the rate of change of acceleration being greater than the predetermined vehicle rate of change of acceleration threshold. In some examples, the control system 100 may, when the control system 100 determines that the vehicle is performing a dynamic driving event, determine the valve switching mode to prioritise the valve operating speed of the valve switching mode over an audible noise level of the valve switching mode. In some examples, when the control system 100 has determined that the vehicle is not performing a dynamic driving event, the control system 100 may determine the valve switching mode to prioritise the audible noise level of the valve switching mode over the valve operation speed of the valve switching mode.

The control system 100 may be configured to determine that the vehicle is performing a dynamic driving event in dependence on one or more impact events. The impact event may be an event in which a sudden vertical displacement of a first axle of the vehicle occurs. For example, the vehicle may strike an object (e.g. a kerb, kerbstone, ramp and/or speedbump). The control system 100 may be configured to determine that the vehicle has experienced an impact event based on a signal received from one or more sensors of the vehicle. For example, the control system 100 may receive, with respect to the first axle, a signal comprising at least one of: vertical displacement information received from a suspension height sensor of the vehicle; and vertical acceleration information received from an acceleration sensor of the vehicle. The control system 100 may be configured to determine that the impact event of the first axel has occurred based on the received vertical displacement and/or vertical acceleration information being greater than a respective predetermined threshold. As such, the control system 100 may be configured to determine the vehicle is performing a dynamic driving event based on determining that one or more impact events are occurring.

The control system 100 is configured to determine the valve switching mode in dependence on the one or more vehicle parameters. The valve switching mode may be selected from a plurality of valve switching modes. The plurality of valve switching modes may comprise a first valve switching mode in which a valve operating speed is greater than a valve switching speed threshold, and wherein an audible noise generated by the valve operating is above an audible valve noise threshold. That is, the first valve switching mode may be a valve switching mode that prioritises the valve operating speed over the audible noise level of the valve switching mode. Therefore, the first valve switching mode may be selected for use by the control system 100 when it is determined that the vehicle-level/safety characteristic should be prioritised over user-perceived performance (e.g. the "knock noise" as discussed above).

The plurality of valve switching modes may comprise a second valve switching mode in which the valve operating speed is less than the valve switching speed threshold, and wherein the audible noise generated by the valve operating is below the audible valve noise threshold. That is, the second valve switching mode may be a valve switching mode that prioritises the audible noise level of the valve switching mode over the valve operation speed of the valve switching mode. Therefore, the second valve switching mode may be selected for use by the control system 100 when it is determined that the user-perceived performance may be prioritised without any reduction in vehicle level/safety characteristics.

The valve switching mode is indicative of a current profile to operate the valve. That is, for each valve switching mode, there may be a characteristic current profile, causing the valve switching mode to have one or more switching properties.

Figure 4A:
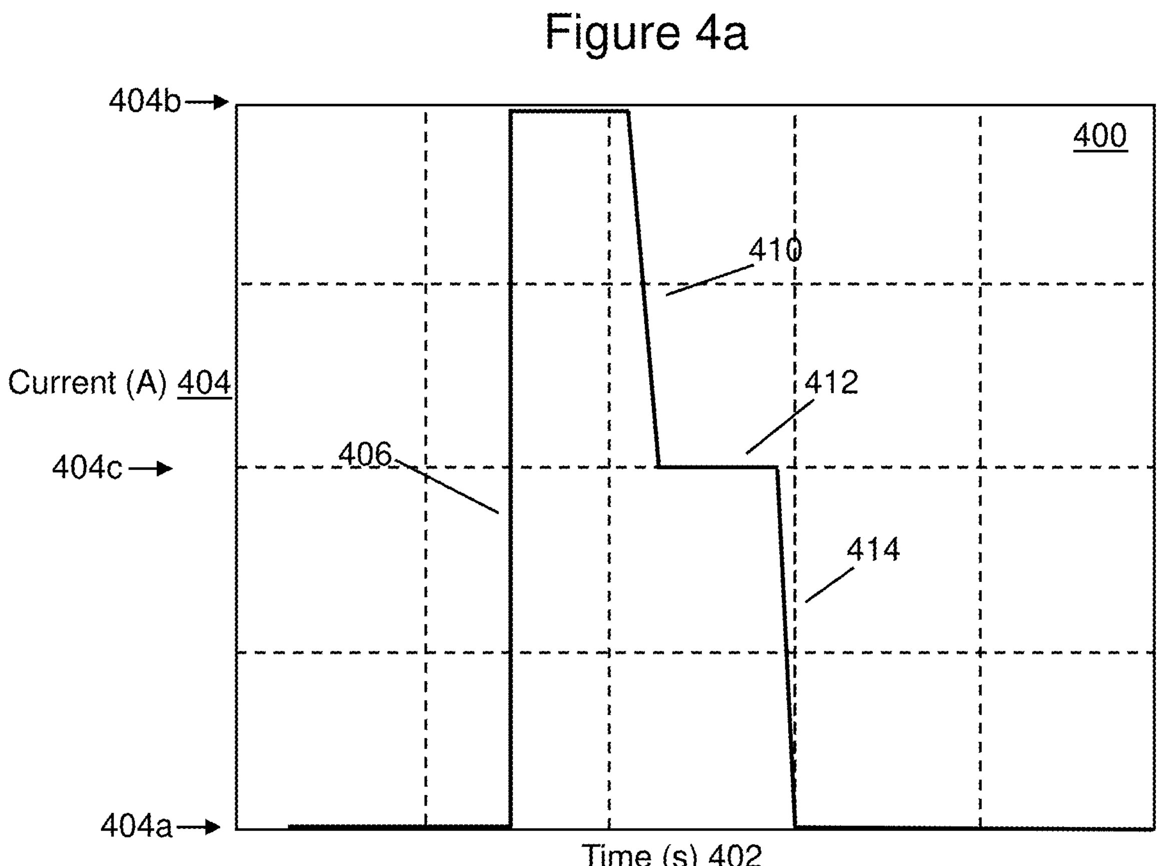
FIGS. 4*a*-4*b* show example current profiles for controlling a valve of an air spring according to examples disclosed herein.

For the first valve switching mode, discussed above, the current profile may be such that the valve moves from one state (e.g. off/on) to another (on/off) in a short time, for example as quickly as the valve is able to physically close. This is so that the multi-chamber air spring can adapt quickly to any demands from the vehicle suspension system. As such, the current profile may be shaped such that the current increases linearly to a maximum value. For example, the current profile may be a square-wave function (or substantially a square wave as there will be a finite timeframe between the valve being open and being closed, and vice versa), as shown in FIG. 4*a*. At the vehicle-level, such a current profile may cause the valve to operate in a speed efficient manner. However, such a current profile may cause a valve to exhibit a "knock" noise when the valve reaches a travel limit, for example when fully open or fully closed.

The current profile 400 of FIG. 4*a* is schematic and does not accurately depict any particular mathematical function curve. FIG. 4*a* illustrates a current profile 400 comprising a current 404 against time 402. The current profile 400 shows a current 404 which may be applied to a valve in a multi-chamber air spring to close and open the valve. The current profile 400 illustrated comprises a closure portion 406 indicative of a current configured to cause the valve to close. The closure portion comprises a predominantly linear current increase from a low current value 404*a* (e.g. ~0 A) to a high current value 404*b* (e.g. of the order of 1 A-5 A). The current profile 400 then comprises a de-energising portion 410 from the high current value 404*b* to a non-zero current 404*c*, between the high current value 404*b* and the low current value 404*a*. Following this, there is a hold portion 412 at the constant non-zero current 404*c* indicative of a current configured to maintain the valve in a closed position. Then, to open the valve, there is an opening portion 414 indicative of a current configured to cause the valve to open. The opening portion 414 comprises a linear current decrease.

For the second valve switching mode, discussed above, the current profile is shaped such that the valve moves from one state (e.g. off/on) to another (on/off) quietly. That is, the multi-chamber air spring does not produce the "knock" noise associated with the first switching mode (or a noise caused by the closure or opening of the valve is low volume). However, such a current profile may cause a valve to transition from one state to another (e.g. on/off) over a longer time period when compared to the current profile of the first switching mode. As such, the second valve switching mode may be slightly less reactive than the first valve switching mode. The current profile of the second valve switching mode may be shaped such that the current increases with a decreasing slope of curvature as a function of time. For example, the current profile may comprise a curved portion, as shown in FIG. 4*b*.

Figures 4B, 5:
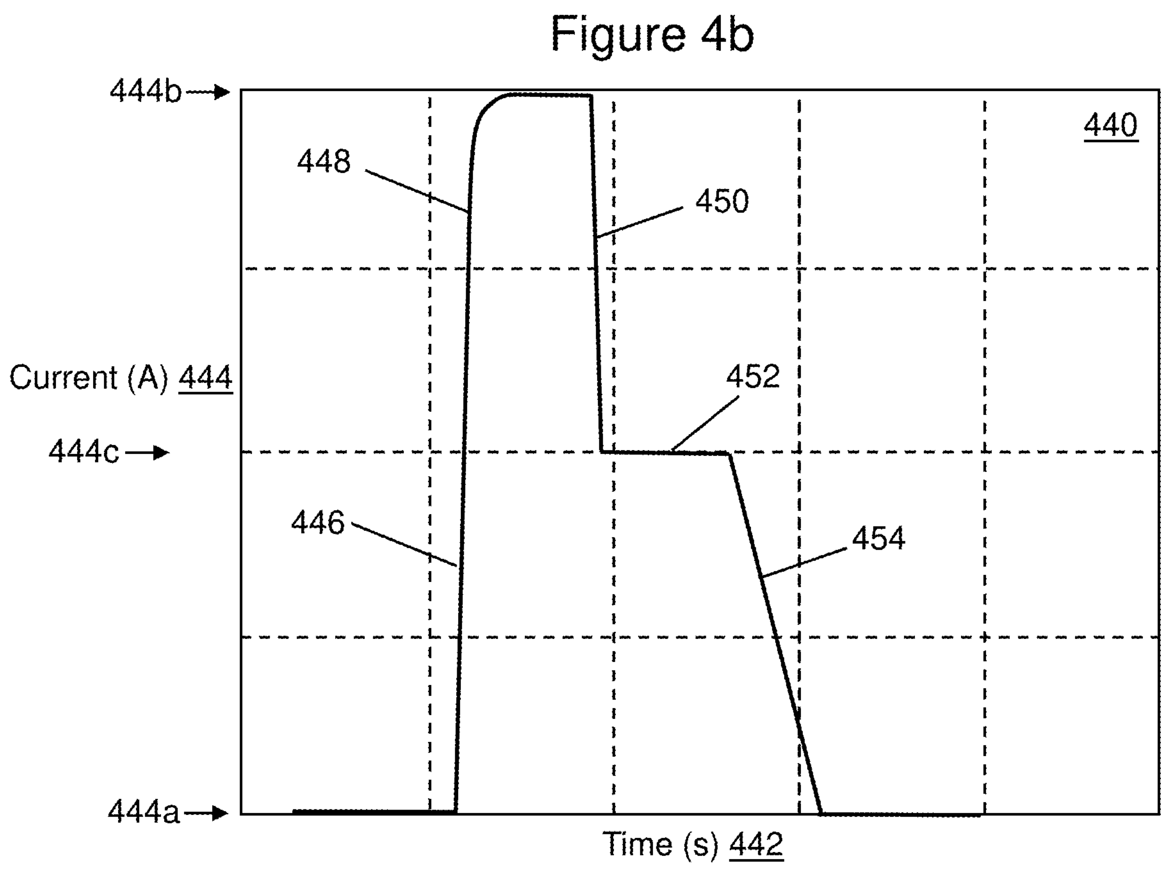
FIG. 5 shows an example system according to examples disclosed herein.

The current profile 440 of FIG. 4*b* is schematic and does not accurately depict any particular mathematical function curve. FIG. 4*b* illustrates a current profile 440 comprising a current 444 against time 442. The current profile 440 shows a current 444 which may be applied to a valve in a multi-chamber air spring to close and open the valve. The current profile 440 comprises: a closure portion 446, 448, indicative of a current configured to cause the valve to close, the closure portion comprising a linear current increase 446 and the curved portion 448 to increase the current from a low current value 444*a* (e.g. ~0 A) to a high current value 444*b*

(e.g. of the order of 1 A-5 A); a de-energising portion 450 from the high current value 444*b* to a non-zero current 444*c*, between the high current value 444*b* and the low current value 444*a*; a hold portion 452 at the constant non-zero current 444*c* indicative of a current configured to maintain the valve in a closed position; and an opening portion 454 indicative of a current configured to cause the valve to open, the opening portion comprising a linear current decrease. By controlling the valve movement at the end of the travel to a closed position using a curved current profile 448, the valve close may be performed to provide a slower (i.e. softer) closure and thereby reduce knock sounds being formed due to the valve hitting the far wall to completely close the aperture between air chambers.

The control system 100 may be configured to retrieve the current profile 400, 440 by retrieving the current profile from a stored profile repository in some examples. In some examples the current profile may be a fixed (predetermined) profile, and for example may be programmed into a circuit component such as an integrated circuit (IC) or field-programmable gate array (FPGA) or other part of the valve controller 100, or may be stored in a memory for retrieval by the processor. In some examples, to help provide a flexible implementation, the profiles are generated via software and a representative current demand value signal is sent to an IC that uses the current demand value signal to build up the current (e.g. the IC may comprise an ASIC/FPGA or a gate driver unit).

The control system 100 may be configured to receive a plurality of vehicle parameters, as illustrated in FIG. 5. For example, the control system 100 may be configured to receive two or more of: a vehicle speed; a vehicle acceleration; a road surface roughness on which the vehicle is moving; a vehicle engine revolution rate; a state of an in-vehicle entertainment system; a weather condition; a number of driving surface inputs to a suspension system of the vehicle exceeding a predetermined input number threshold; a magnitude of driving surface inputs to a suspension system of the vehicle exceeding a predetermined input magnitude threshold; a rate of change of acceleration of the vehicle; and one or more impact events in which the vehicle impacts an object during driving. In an example, the plurality of vehicle parameters 502*a*, 502*b*, 502*c*, 502*d* may comprise the vehicle speed, the number and a magnitude of driving surface inputs to a suspension system of the vehicle; the rate of change of acceleration of the vehicle, and an indication of one or more impact events. The control system 100 may be configured to determine the valve switching mode in dependence on the received plurality of vehicle parameters 502*a*, 502*b*, 502*c*, 502*d*. The control system 100 may be configured to output 504 a valve control signal to operate the valve in accordance with the determined valve switching mode.

The control system 100 may be configured to determine the valve switching mode based on a conditional treatment of the received plurality of vehicle parameters. For example, the control system 100 may be configured to operate the valve in accordance with a particular valve switching mode until a threshold number of switching conditions are fulfilled. If fulfilled, the control system 100 may be configured to change the valve switching mode to another valve switching mode. In some examples, the control system 100 may be configured to determine that the threshold number of switching conditions are fulfilled within a predetermined period of time in order to change the valve switching mode to the another valve switching mode. For example, the predetermined period of time may be indicative of a sensitivity and accuracy of changing the valve switching mode. That is, the shorter the predetermined period of time, the less sensitive to changing the valve switching mode will be (because the time period in which to fulfil the switching conditions is smaller), but the more accurate the changing of the valve switching mode will be (because the time in which to fulfil the switching conditions does not extend as far from a current time, and thus current driving condition). For example, if the predetermined period of time is large, the control system 100 may still account for switching conditions that no longer apply to the vehicle's current driving conditions.

As an example, the control system 100 may be configured to receive a plurality of vehicle parameters 502*a*, 502*b*, 502*c*, 502*d*. The plurality of vehicle parameters 502*a*, 502*b*, 502*c*, 502*d* may comprise: the vehicle speed, the number and the magnitude of driving surface inputs to a suspension system of the vehicle; the rate of change of acceleration of the vehicle, and one or more impact events. The control system 100 may be configured to determine the valve switching mode in dependence on this plurality of vehicle parameters 502*a*, 502*b*, 502*c*, 502*d*. The control system 100 may be configured to compare each of the vehicle parameters 502*a*, 502*b*, 502*c*, 502*d* within the received plurality of vehicle parameters to respective vehicle condition thresholds, wherein the respective vehicle condition thresholds relate to one or more of the audio vehicle driving condition and the dynamic vehicle driving condition. The control system 100 may be configured to determine the valve switching mode in dependence on, within a predetermined period of time, the plurality of vehicle parameters 502*a*, 502*b*, 502*c*, 502*d* indicating a threshold number switching conditions. For example, the control system 100 may be configured to, within the predetermined period of time, determine that the plurality of vehicle parameters 502*a*, 502*b*, 502*c*, 502*d* indicate a threshold number of the following conditions: the vehicle speed being below a predetermined speed threshold; the number and the magnitude of the driving surface input being below respective predetermined number and magnitude thresholds; the rate of change of acceleration being less than a predetermined acceleration threshold; and a number of object impact signals associated with the one or more impact events being below a predetermined impact threshold. The threshold number may be one or more of the switching conditions.

With reference to the first and second valve switching modes, discussed above, the control system 100 may be configured to operate the valve in accordance with the first valve switching mode in which the valve operating speed is greater than the valve switching speed threshold, and wherein an audible noise generated by the valve operating is above the audible valve noise threshold; and output the valve control signal to operate the valve in accordance with the second valve switching mode in which the valve operating speed is less than the valve switching speed threshold, and wherein the audible noise generated by the valve operating is below the audible valve noise threshold, in dependence on, within a predetermined period of time, the plurality of vehicle parameters 502*a*, 502*b*, 502*c*, 502*d* indicating the threshold number of the switching conditions above.

Figure 6:
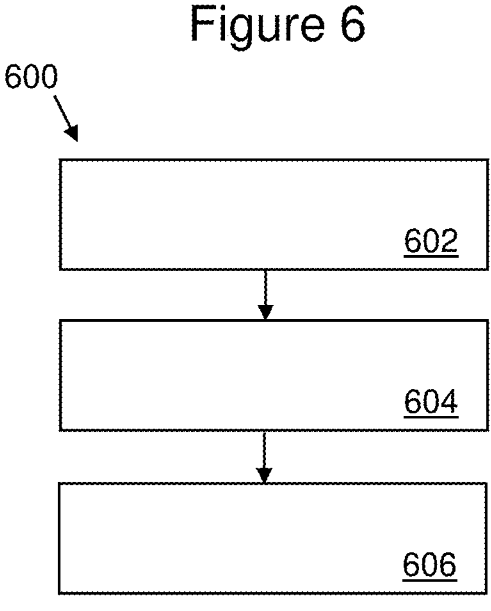
FIG. 6 shows an example method according to examples disclosed herein.

FIG. 6 shows an example method 600 of operation of a multi-chamber air spring. The multi-chamber air spring comprises at least a first chamber and a second chamber and a valve therebetween, as described above. The method 600 comprises: receiving 602 a signal indicative of one or more vehicle parameters, the one or more vehicle parameters indicative of one or more vehicle driving conditions; determining 604 a valve switching mode in dependence on the one or more vehicle parameters, wherein the valve switching mode is indicative of a current profile to operate the valve; and outputting 606 a valve control signal to operate the valve in accordance with the determined valve switching mode. The method 600 may be performed by the control system 100 illustrated in FIG. 1. In particular, the memory 130 may comprise computer-readable instructions (e.g. computer software) which, when executed by the processor 120 of a control system 100 disclosed herein, perform a method 600 as disclosed herein. Also disclosed herein is a non-transitory, computer-readable storage medium storing instructions thereon that, when executed by one or more electronic processors of a control system 100 as disclosed herein, causes the one or more electronic processors to carry out a method 600 as disclosed herein.

The blocks illustrated in FIG. 6 may represent steps in a method 600 and/or sections of code in a computer program configured to control the control system as described above to perform the method steps. The illustration of a particular order to the blocks does not necessarily imply that there is a required or preferred order for the blocks and the order and arrangement of the block may be varied. Furthermore, it may be possible for some steps to be omitted or added in other examples.

Figure 7:
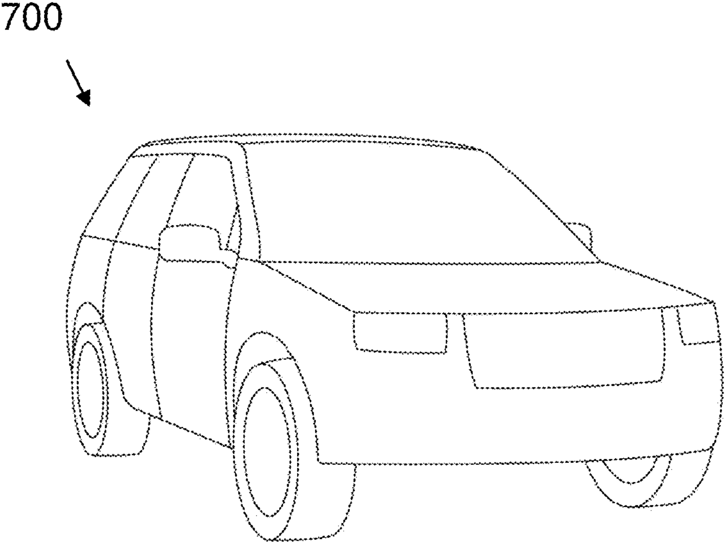
FIG. 7 illustrates an example vehicle according to examples disclosed herein.

FIG. 7 illustrates an example vehicle according to examples disclosed herein, e.g. comprising a control system 100 or system 300 disclosed herein. The vehicle 700 in the present embodiment is an automobile, such as a wheeled vehicle, but it will be understood that the control system and active suspension system may be used in other types of vehicle.

As used here, 'connected' means either 'mechanically connected' or 'electrically connected' either directly or indirectly. Connection does not have to be galvanic. Where the control system is concerned, connected means operably coupled to the extent that messages are transmitted and received via the appropriate communication means. The term "control system" may be understood to cover a controller, control module, or control element and need not necessary be a multi-element or distributed system (although it may be in some examples).

It will be appreciated that various changes and modifications can be made to the present disclosed examples without departing from the scope of the present application as defined by the appended claims. Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a multi-chamber air spring of a suspension system of a vehicle, the multi-chamber air spring comprising at least a first chamber and a second chamber and a valve therebetween, the control system comprising one or more controllers, the control system configured to:

receive a signal indicative of one or more vehicle parameters, the one or more vehicle parameters indicative of one or more vehicle driving conditions;

determine a valve switching mode in dependence on the one or more vehicle parameters, wherein the valve switching mode is indicative of a predetermined electric current profile to open and close the valve, the predetermined electric current profile comprising a magnitude of electric current versus time; and output a valve control signal to operate the valve in accordance with the determined valve switching mode.

2. The control system of claim 1, wherein the one or more vehicle parameters indicate an audio vehicle driving condition associated with audio noise, and wherein determining the valve switching mode comprises determining whether an audio noise level of the audio vehicle driving condition is above or below a predetermined audio noise threshold.

3. The control system of claim 2, wherein the one or more vehicle parameters indicating the audio vehicle driving condition comprise one or more of:

a vehicle speed;

a vehicle acceleration;

a road surface roughness on which the vehicle is moving;

a vehicle engine revolution rate;

a state of an in-vehicle entertainment system; and a weather condition.

4. The control system of claim 1, wherein the one or more vehicle parameters indicate a dynamic vehicle driving condition associated with a dynamic driving event, and wherein determining the valve switching mode comprises determining whether the dynamic driving event is occurring based on the one or more vehicle parameters.

5. The control system of claim 4, wherein the one or more vehicle parameters indicating the dynamic vehicle driving condition comprise one or more of:

a number of driving surface inputs to a suspension system of the vehicle exceeding a predetermined input number threshold, wherein the driving surface inputs cause actuation of an air spring of the suspension system;

a magnitude of driving surface inputs to a suspension system of the vehicle exceeding a predetermined input magnitude threshold, wherein the driving surface inputs cause actuation of an air spring of the suspension system;

a rate of change of acceleration of the vehicle associated with a dynamic driving event; and one or more impact events in which the vehicle impacts an object during driving.

6. The control system of claim 5, wherein the one or more vehicle parameters comprise the rate of change of acceleration of the vehicle, wherein the control system is configured to:

receive an indication of the rate of change of acceleration from an accelerometer of the vehicle;

compare the rate of change of acceleration to a predetermined rate of change of acceleration threshold; and determine that the vehicle is performing a dynamic driving event in dependence on the rate of change of acceleration being greater than the predetermined vehicle rate of change of acceleration threshold.

7. The control system of claim 1, wherein the valve switching mode is selected from a plurality of valve switching modes comprising:

a first valve switching mode in which a valve operating speed is greater than a valve switching speed threshold, and wherein an audible noise generated by the valve operating is above an audible valve noise threshold; and a second valve switching mode in which the valve operating speed is less than the valve switching speed threshold, and wherein the audible noise generated by the valve operating is below the audible valve noise threshold.

8. The control system of claim 1, wherein the control system is configured to:

receive a plurality of vehicle parameters, comprising a vehicle speed, a number and a magnitude of driving surface inputs to a suspension system of the vehicle; a rate of change of acceleration of the vehicle, and one or more impact events; and determine the valve switching mode in dependence on this plurality of vehicle parameters.

9. The control system of claim 8, wherein the control system is configured to:

operate the valve in accordance with a first valve switching mode in which the valve operating speed is greater than a valve switching speed threshold, and wherein an audible noise generated by the valve operating is above an audible valve noise threshold; and output the valve control signal to operate the valve in accordance with a second valve switching mode in which the valve operating speed is less than the valve switching speed threshold, and wherein the audible noise generated by the valve operating is below the audible valve noise threshold, in dependence on, within a predetermined period of time, the plurality of vehicle parameters indicating a threshold number of the following switching conditions:

the vehicle speed being below a predetermined speed threshold;

the number and the magnitude of the driving surface input being below respective predetermined number and magnitude thresholds;

the rate of change of acceleration being less than a predetermined acceleration threshold; and a number of object impact signals associated with the one or more impact events being below a predetermined impact threshold.

10. An air spring system for a vehicle, comprising:

a multi-chamber air spring; and the control system of claim 1.

11. A vehicle suspension system comprising the air spring system of claim 10.

12. A vehicle comprising a vehicle suspension system according to claim 11.

13. A vehicle comprising an air spring system according to claim 10.

14. A vehicle comprising a control system according to claim 1.

15. A method of operation of a multi-chamber air spring, the multi-chamber air spring comprising at least a first chamber and a second chamber and a valve therebetween, the method comprising:

receiving a signal indicative of one or more vehicle parameters, the one or more vehicle parameters indicative of one or more vehicle driving conditions;

determining a valve switching mode in dependence on the one or more vehicle parameters, wherein the valve switching mode is indicative of a predetermined electric current profile to open and close the valve, the predetermined electric current profile comprising a magnitude of electric current versus time; and outputting a valve control signal to operate the valve in accordance with the determined valve switching mode.

16. A non-transitory, computer-readable storage medium storing instructions thereon that, when executed by one or more electronic processors of a control system, causes the one or more electronic processors to carry out a method according to claim 15.

* * * * *